United States Patent Office 3,849,423
Patented Nov. 19, 1974

3,849,423
3-BENZYLPYRIDINES
Eriks V. Krumkalns, Indianapolis, and William A. White, Fountaintown, Ind., assignors to Eli Lilly and Company of Indianapolis, Ltd., Indianapolis, Ind.
No Drawing. Filed Mar. 22, 1971, Ser. No. 126,919
Int. Cl. C07d 31/48
U.S. Cl. 260—294.8 G                         6 Claims

ABSTRACT OF THE DISCLOSURE

Novel substituted benzylpyridines and acid addition salts thereof useful as fungicides and herbicides.

BACKGROUND OF THE INVENTION

In the prior art, Sperber et al., U.S. Pat. 2,727,895 (Dec. 20, 1955), teach that certain pyridine derivatives possess antifungal and antibacterial properties, the preferred compounds being those in which the pyridine moiety is substituted in the 4-position, the compounds to be administered in a variety of the usual pharmaceutical forms, thus being directed toward human use. In our hands, these compounds of Sperber et al. showed minimal activity against plant fungi.

Also in the prior art, Van Heyningen, U.S. Pat. 3,396,-224 (Aug. 6, 1968), discloses the use of diaryl 3-pyridine-methanols and derivatives against fungi pathogenic to food crops, as well as to ornamental plants such as roses.

Further, Van Heyningen et al., U.S. Pat. 3,397,273 (Aug. 13, 1968), teach the use of diaryl 3-pyridylmethanes as fungicides for plant pathogenic fungi.

Novel 9-(3-pyridyl)xanthene and thioxanthene compounds are taught by Krumkalns in U.S. Pat. 3,335,148 (Aug. 8, 1967) and U.S. Pat. 3,361,753 (Jan. 2, 1968), respectively, the compounds being taught as active against certain plant pathogenic fungi.

SUMMARY

The present invention relates to certain substituted benzylpyridines which possess activity as plant and soil fungicides, and as herbicides.

DESCRIPTION

This invention relates to certain substituted benzylpyridine compounds of the formula:

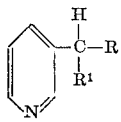

wherein

R is phenyl or substituted phenyl;
R¹ is —X—R² or

R² is phenyl or substituted phenyl;
X is oxygen or sulfur;
R³ and R⁴, when taken separately, are the same or different, and are hydrogen or $C_1$-$C_4$ alkyl;
R³ and R⁴, when taken together with the nitrogen to which they are attached, form a piperidino, morpholino, aziridino, or piperazino ring;
and the acid addition salts thereof.

In the above formula, substituted phenyl is phenyl substituted in one or more positions of the ring with bromine, chlorine, iodine, or fluorine; $C_1$-$C_3$ alkyl, such as methyl, ethyl, n-propyl, or isopropyl; nitro, amino, hydroxy, trifluoromethyl, trifluoromethoxy, trifluoromethylmercapto, trifluoromethylsulfoxy, trifluoromethylsulfonyl, methylmercapto, cyano, or methylsulfonyl; or $C_1$-$C_3$ alkoxy, which includes methoxy, ethoxy, and propoxy.

While the compounds of the present invention have been defined in terms of a structural formula which depicts the novel structural features of the claimed compounds and which indicates the presence therein of certain well-known organic radicals, including alkyl, piperidino, morpholino, aziridino, and piperazino, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to be within the scope of the invention. Among such substituent atoms and radicals are halo, hydroxy, nitro, lower alkyl, amino, trifluoromethyl, trifluoromethoxy, trifluoromethylmercapto, trifluoromethylsulfoxy, trifluoromethylsulfonyl, alkoxy, methylmercapto, cyano, methylsulfonyl, and the like.

Suitable acid addition salts of the bases represented by the above formula can be prepared, employing for example, the following acids; hydrochloric, hydrobromic, sulfuric, phosphoric, nitric, oxalic, methanesulfonic, p-toluenesulfonic, maleic, and the like.

The following compounds are representative of the novel compounds comprehended as coming within the scope of this invention:

α-(2-fluorophenyl)-N,N-diethyl-3-pyridylmethylamine
α-(3-bromophenyl)-3-pyridylmethylamine hydrobromide
1-[α-(3-pyridyl)benzyl]morpholine
3-[α-(4-trifluoromethylphenylthio)-4-bromobenzyl]-pyridine
3-[α-(4-trifluoromethoxyphenylthio)-4-chlorobenzyl]-pyridine
1-[α-(3-pyridyl)benzyl]aziridine
α-(3-chlorophenyl)-N,N-dimethyl-3-pyridylmethylamine
1-[3-chloro-α-(3-pyridyl)benzyl]morpholine dihydrochloride
3-[α-(4-trifluoromethylmercaptophenylthio)-4-bromobenzyl]pyridine
α-(3-trifluoromethylsulfonylphenyl)-N,N-dimethyl-3-pyridylmethylamine
3-[α-(3-trifluoromethylsulfoxyphenylthio)-4-chlorobenzyl]pyridine
3-[α-(3-trifluoromethoxyphenoxy)-4-bromobenzyl]-pyridine and the like.

The novel compounds of this invention have useful antifungal and herbicidal properties.

The novel compounds of this invention are utilized as fungicides by applying them to infected or susceptible plant surfaces, or to the soil, in such manner as to contact the fungi it is desired to control. This is conveniently accomplished by spraying, dipping, dusting or drenching.

For such use, the compounds are formulated into compositions desirably containing, in addition to the benzylpyridine, one or more of a plurality of additaments including water, polyhydroxy compounds, petroleum distillates, and other dispersion media, surface-active dispersing agents, emulsifiers, and finely divided inert solids. The concentration of the benzylpyridine compound in these compositions may vary depending on whether the composition is intended as an emulsifiable concentrate or a wettable powder designed to be subsequently diluted with additional inert carrier such as water to produce the ultimate treating composition, or is intended for direct application as a dust to plants.

The novel compounds of the instant invetion are applied to plants in effective amounts, varying somewhat with the particular organism, with the severity of the fungus infection, and with other factors such as the environment in which treatment is conducted. In general, it is found that an aqueous spray containing from about 40 to about 400 p.p.m. of active material is satisfactory when treatment is to be carried out in the greenhouse.

As is well understood in the art, a somewhat higher concentration of the active compound is desirable when treatment is to be carried out in the field. In that case, the preferred range is from about 80 to about 1000 p.p.m. of benzylpyridine.

In addition to the above-described antifungal properties, the novel benzylpyridines have shown interesting pre-emergence herbicidal activity when applied at rates of from about 2 to about 8 pounds per acre of soil.

The novel compounds coming within the scope of the structural formula, *supra,* are readily prepared by methods set forth hereinbelow:

In the case where $R^1$ is —X—$R^2$, and X is oxygen or sulfur (in the generic formula description, supra), the process of synthesis is accomplished by reacting an α-halo-3-benzyl (or substituted benzyl) pyridine with the sodium salt of a phenol, or a thiophenol, or the sodium salt of an alkyl alcohol or alkyl mercaptan. The reaction is conducted in a suitable solvent, such as dimethylformamide, tetrahydrofuran, benzene, or the like. The reaction mixture is heated to refluxing temperature and held at that temperature for a time sufficient to promote substantial completion of the reaction. Suitable reaction time varies from about one to about fifteen hours, depending on the solvent used and the reactants involved. The reaction product mixture can be worked up by pouring into a large quantity of water, and isolating the pure product therefrom by removal of the solvent and purification of the residue by appropriate steps, such as recrystallization of solid residues, or distillation of liquid residues.

In compounds where $R^1$ is

the synthesis can be carried out by reacting an α-halo-3-(benzyl or substituted benzyl)pyridine with a suitable primary or secondary amine, such as di($C_1$-$C_4$ alkyl) amine, piperidine, or piperazine. The reaction can be carried out at reflux temperature of the mixture, using as a solvent an excess of the amine, for example, or other suitable solvent, such as dimethylformamide, benzene or the respective amine itself, or the like. The product is isolated from the reaction product mixture in a manner analogous to that described hereinabove.

The preparations of the novel compounds of this invention are illustrated in the following manner:

Preparation 1.—3-(α-Phenylthiobenzyl)pyridine

To 12.5 gm. (0.05 mole) of α-chloro-3-benzylpyridine hydrochloride salt was added aqueous sodium bicarbonate, and the mixture extracted with ether. The ether extract was dried and the ether removed at reduced pressure, leaving α-chloro-3-benzylpyridine free base as a residue. The sodium salt of thiophenol was prepared by mixing 5.5 gm. (0.05 mole) thiophenol and 2.7 gm. sodium methoxide in 50 ml. of dry ethanol and evaporating the mixture to dryness. To the dry residue was added the previously prepared α-chloro-3-benzylpyridine dissolved in 100 ml. of dry dimethylformamide, and the reaction mixture heated to refluxing temperature for about 2 hours, and the reaction product mixture poured into about 350 ml. of water. The aqueous mixture was extracted three times with 100 ml. portions of ether, the ether extracts combined, dried, and evaporated to yield a crude crystalline material which was recrystallized from a mixture of petroleum ether and cyclohexane to yield 9 gm. of product identified by elemental analyses and nuclear magnetic resonance spectrum as 3-(α-phenylthiobenzyl)pyridine, having a m.p. of about 59–60° C.

Following the same general procedure set forth above and using appropriate starting materials, the following additional compound was prepared:

3-[α-(4-Chlorophenylthio) - 4 - chlorobenzyl]pyridine, having b.p. 180–183° C. at 0.1 mm.

Preparation 2.—3-(α-Phenoxybenzyl)pyridine

A mixture of 11.6 gm. (0.1 mole) sodium phenolate, 24.0 gm. 0.1 mole) α-chloro-3-benzylpyridine, and 200 ml. of dry dimethylformamide was refluxed for about 5 hours. The reaction product mixture was cooled, poured into 500 ml. distilled water, and the aqueous mixture extracted several times with ether. The combined ether extracts were dried, the solvent removed at reduced pressure and the residue distilled *in vacuo* to yield product identified as 3-(α-phenoxybenzyl)pyridine, having a b.p. of about 185° C. at 1 mm.; $n_D^{25}$ 1.6112. Wt. 4.0 gm.

Preparation 3.—α-(4-Chlorophenyl)-N,N-di(n-propyl)-3-pyridylmethylamine

A mixture of 24 gm. (0.1 mole) α-chloro-3-(4-chlorobenzyl)pyridine, 100 ml. di-n-propyl-amine, and 50 ml. dimethyl formamide was refluxed for about 12 hours. The reaction product mixture was concentrated *in vacuo* and ether added. The solids which precipitated were removed by filtering, and the filtrate again concentrated *in vacuo.* The residual oil was poured onto a 500 g. florosil column, using benzene as the solvent and eluent.

A total of 4 fractions were collected, concentrated, and each fraction was examined by NMR. Cut 4 was identified as α-(4-chlorophenyl)-N,N-di(n-propyl) - 3-pyridylmethylamine, weighing 15 gm.; $n_D^{25}$ 1.5621.

Preparation 4.—1-[α-(3-Pyridyl)benzyl]-piperidine

A mixture of 11.5 gm. (0.05 mole) of α-chloro-3-(benzyl)-pyridine hydrochloride, 50 gm. (0.6 mole) piperidine, and 6 gm. (0.05 mole) potassium carbonate was heated to reflux temperature for about 3 hours, after which 50 ml. water was added to the mixture, and refluxing continued an additional 2 hours.

The reaction product mixture was concentrated at reduced pressure and the residual oil was dissolved in 100 ml. of ethyl ether. The ether solution was washed three times with 100 ml. portions of water, dried over anhydrous magnesium sulfate. The dried ether solution was concentrated to remove the solvent. The crude product obtained was recrystallized from a mixture of methanol and water to yield crystalline product which was identified by NMR spectrum, potentiometric titration and elemental anaylses as 1-[α - (3-pyridyl)benzyl]piperidine, having a melting point of about 85–86° C.; Wt. 9 gm.

We claim:
1. A compound of the formula

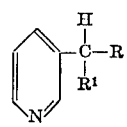

wherein
R is phenyl or 4-chlorophenyl;
$R_1$ is X—$R^2$;
$R^2$ is selected from the group consisting of phenyl, 4-chlorophenyl, 3-trifluoromethylsulfonylphenyl, and 4-trifluoromethoxyphenyl;
X is oxygen or sulfur;
and the acid addition salts thereof.

2. A compound as in claim 1, said compound being 3-[α-(4-chlorophenylthio)-4-chlorobenzyl]pyridine.

3. A compound as in claim 1, said compound being 3-[α-(3-trifluoromethylsulfonylphenylthio) - 4 - chlorobenzyl]pyridine.

4. A compound as in claim 1, said compound being 3-[α-(4-trifluoromethoxyphenylthio) - 4 - chlorobenzyl]pyridine.

5. A compound as in claim 1, said compound being 3-(α-phenoxybenzyl)pyridine.

6. A compound as in claim 1, said compound being 3-(α-phenylthiobenzyl)pyridine.

References Cited

UNITED STATES PATENTS

| | | | |
|---|---|---|---|
| 2,727,895 | 12/1955 | Sperber et al. | 260—290 |
| 3,119,877 | 1/1964 | Cambell et al. | 260—609 |
| 3,634,437 | 1/1972 | Todd | 260—293.77 |

OTHER REFERENCES

Carissimi et al.: Chemical Abstracts, vol. 52, p. 12859e (1958).

JOSEPH A. NARCAVAGE, Primary Examiner

J. TOVAR, Assistant Examiner

U.S. Cl. X.R.

260—247.5 G, 268 H, 293.69, 294.8 R, 296 R, 297 R; 424—263